Oct. 1, 1963   JAMES E. WEBB, ADMINISTRATOR   3,105,515
               OF THE NATIONAL AERONAUTICS
               AND SPACE ADMINISTRATION
               PRESSURE REGULATING SYSTEM

Filed March 7, 1962                        2 Sheets-Sheet 1

O.F. KELLER
W.F. MacGLASHAN
            INVENTORS,

BY
   ATTORNEYS

Oct. 1, 1963
JAMES E. WEBB, ADMINISTRATOR
OF THE NATIONAL AERONAUTICS
AND SPACE ADMINISTRATION
PRESSURE REGULATING SYSTEM
3,105,515
Filed March 7, 1962
2 Sheets-Sheet 2
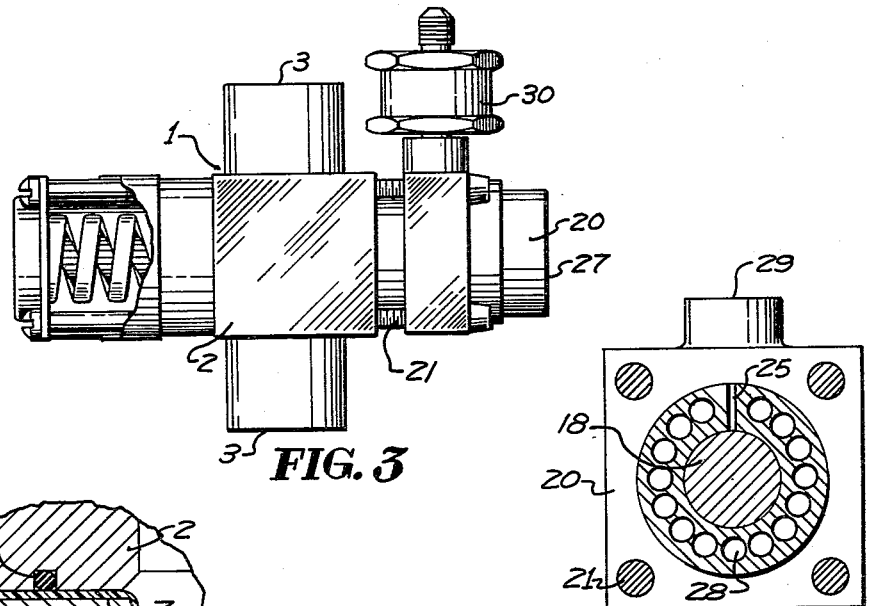
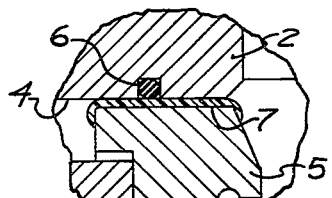
FIG. 5
FIG. 3
FIG. 6
FIG. 4
O. F. KELLER
W. F. MacGLASHAN
INVENTORS,
BY
ATTORNEYS United States Patent Office 3,105,515
Patented Oct. 1, 1963

3,105,515
PRESSURE REGULATING SYSTEM
James E. Webb, Administrator of the National Aeronautics and Space Administration, with respect to an invention of Orville F. Keller and William F. MacGlashan, Jr.
Filed Mar. 7, 1962, Ser. No. 180,394
2 Claims. (Cl. 137—495)

This invention relates to a pressure regulating system and included in the objects of this invention are:

First, to provide a pressure regulating system which is particularly adapted to maintain a constant downstream pressure while the upstream pressure diminishes from an initial pressure which is extremely high with respect to the desired downstream pressure.

Second, to provide a pressure regulating system which may remain inactivated for long periods of time, then be brought into operation by sudden release of the pressure source without producing pressure surges which would damage components of the pressure regulating means.

Third, to provide a pressure regulating system which incorporates a novelly arranged regulator valve and control valve which so co-act that, initially, the pressure fluid is applied to the regulator valve in such a manner as to hold the regulator valve closed until needed, and thereafter the regulator valve functions to maintain a constant downstream pressure; the regulator valve also incorporating means whereby, in its initial closed position, any leakage of pressure fluid into the regulator valve is bled therefrom rather than being introduced into the downstream side of the regulator valve.

Fourth, to provide a regulator valve wherein the valve and valve seat elements may be readily removed from service or to change the effective port areas thereby to change the operating characteristics of the regulator valve.

Fifth, to provide a pressure regulating system in which operation of the regulator valve is damped to prevent pressure surges in the system and to prevent vibration or squeeling of the regulator valve.

With the above and other objects in view as may appear hereinafter, reference is directed to the accompanying drawings, in which:

FIGURE 3 is an elevational view of the regulator valve.

FIGURE 4 is an enlarged sectional view thereof taken in a plane parallel to FIGURE 3.

FIGURE 5 is a detailed view taken within circle 5 of FIGURE 4 showing the antifriction coating on one of the valve pistons.

FIGURE 6 is a transverse sectional view through 6—6 of FIGURE 4.

Figure 1:
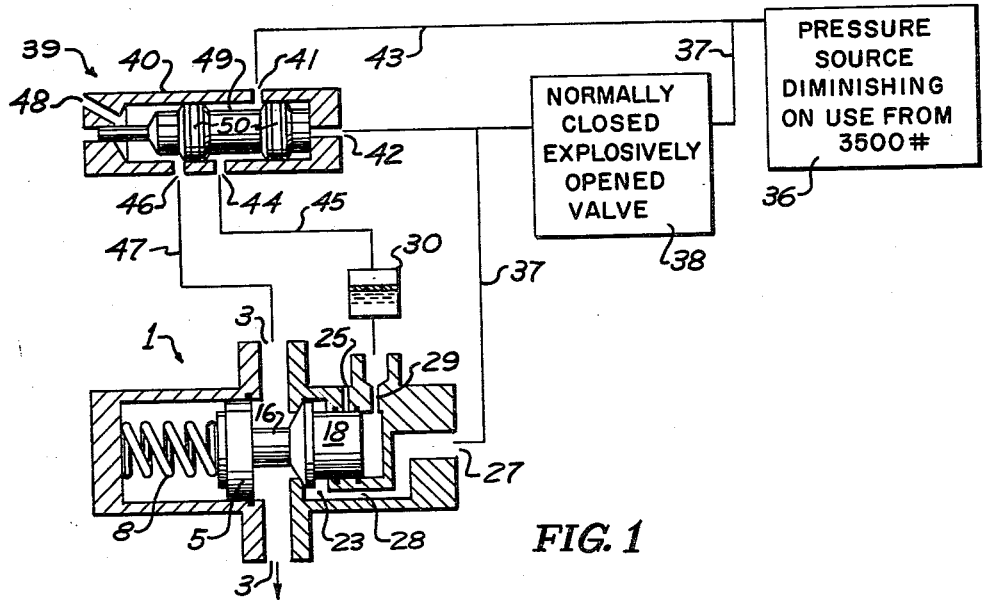
FIGURE 1 is a diagrammatical view showing the pressure regulating system in its initial or inoperative condition.

The pressure regulating system includes a regulator valve 1, which includes a valve body 2 having a pair of coaxial outlets 3 between which is interposed a valve bore 4 at right angles thereto. One end of the valve bore receives a piston 5. The surrounding walls of the valve bore receives a seal ring 6 for sealing engagement with the piston 5. The peripheral surface of the piston 5 is provided with an antifriction coating 7, as indicated in FIGURE 5. Teflon has been found particularly suitable for this purpose.

The piston 5 is engaged by a pressure regulating spring 8, the extended end of which is provided with a cap 9. Tension adjustment bolts 11 extend from the cap 9 to the valve body. The tension bolts may be covered by a wrapping 12 of the plastic tape after the regulating spring has been adjusted.

The portion of the valve bore 4 on the opposite sides of the outlets 3 from the piston 5, is provided with an internal shoulder 13 against which seats a valve seat ring 14. Secured to the piston 5 by a bolt 15, is a valve armature 16 which extends through the valve seat formed in the valve seat ring 14 and is provided with a valve seat 17 which engages the valve seat ring 14. The extended end of the valve armature 16 forms a piston 18 equal in diameter to the effective diameter of the valve seat ring 14 and its mating valve armature seat 17. The axial length of the piston 18 is limited by a shoulder 19.

The end of the valve body 2 from which extends the piston 18 of the valve armature 16, is closed by a cap structure 20 which is secured to the valve body by bolts 21. The cap structure includes a sealing skirt 22, which fits within the end of the valve bore 4 and bears against the valve seat ring 14 so as to secure the valve seat ring in place. Internally, the sealing skirt 22 forms with the valve seat ring 14 an inlet chamber 23. The cap structure is provided with a cavity 24 confronting the inlet chamber 23 which receives the piston 18. A movement of the piston into the cavity 24 is limited by the shoulder 19.

The side wall of the cavity 24 is intersected by a bleed port 25, and the walls of the cavity 24 are provided with a pair of seal rings 26 at opposite sides of the bleed port 25, which sealingly engage the piston 18.

The axial outer end of the cap structure 20 is provided with an inlet port 27, which is joined to the inlet chamber 23 by connecting the passages at 28. The cap structure 20 is also provided with a side port at 29, which intersects the inner end of the cavity 24.

An isolation unit 30 is provided which includes a cup member 31 having a screw-threaded stem 32, sealingly fitted in the side port 29. The stem 32 is provided with a passage therethrough communicating with the cup member 31. The passage has a constricted portion forming a flow restrictor 33. The cup member receives a diaphragm 34 which is held in place by a cap member 35, having a skirt which has screw threads within the cup member 31. The region between the diaphragm 34 and the cavity 24 is initially filled completely with a liquid so that any displacement of the diaphragm 34 causes a corresponding movement of the piston 18.

A high pressure fluid source of 36 is provided, which is connected by a high pressure fluid supply line 37 to the inlet port 27. Interposed into the high pressure fluid supply line is a normally closed, explosively opened valve 38 which is, per se, conventional. Alternatively, a normally closed solenoid operated valve, or other type of valve capable of response to remote command, may be used. The purpose of the valve 38 is to isolate the inlet port 27, and inlet chamber 23 from high pressure until such time as it is desired to cause operation of the pressure regulating system.

Also included in the pressure regulating system is a control valve 39 which may be, per se, conventional. The control valve includes a valve body 40, having a high pressure inlet port 41 at one side thereof, and a high pressure operating port 42 at one end thereof. The high pressure inlet port 41 is connected to a high pressure line 43, which bypasses the valve 38 in the supply line 37. The high pressure operating port 42, is connected to a branch of the supply line 37, downstream of the valve 38 so that the operating port 42 is not subjected to pressure until the valve 38 is operated.

The valve body 40 also includes an isolation unit port 44, which is connected by a line 45 to the cap 35 of the isolation unit 30. Still further, the valve body is provided with a regulated pressure port 46, connected by a line 47 to one of the outlet ports 3 of the regulator valve 1. The valve body is also provided with a bleed port 48 located at the end of the valve body opposite from the high pressure operating port 42. The valve body receives a valve armature 49 having two spaced seal rings 50. The various valve ports are so arranged that initially the high pressure line 43 from the fluid source 36, communicates with line 45 through the inlet port 41 and isolation unit port 44, so that pressures applied to the diaphragm 34 forcing the piston 18 to its closed position as shown in FIGURE 1.

Operation of the pressure regulating system is as follows:

As indicated diagrammatically in FIGURE 1, the pressure regulator valve is held in its closed position by pressure applied through the diaphragm 34 against the piston 18. When it is desired to set the pressure regulating system into operation, the explosively operated valve or other normally closed valve under remote command is opened so that simultaneously the valve armature 49 is moved and the pressure is applied to the inlet chamber 23 of the regulator valve.

Figure 2:
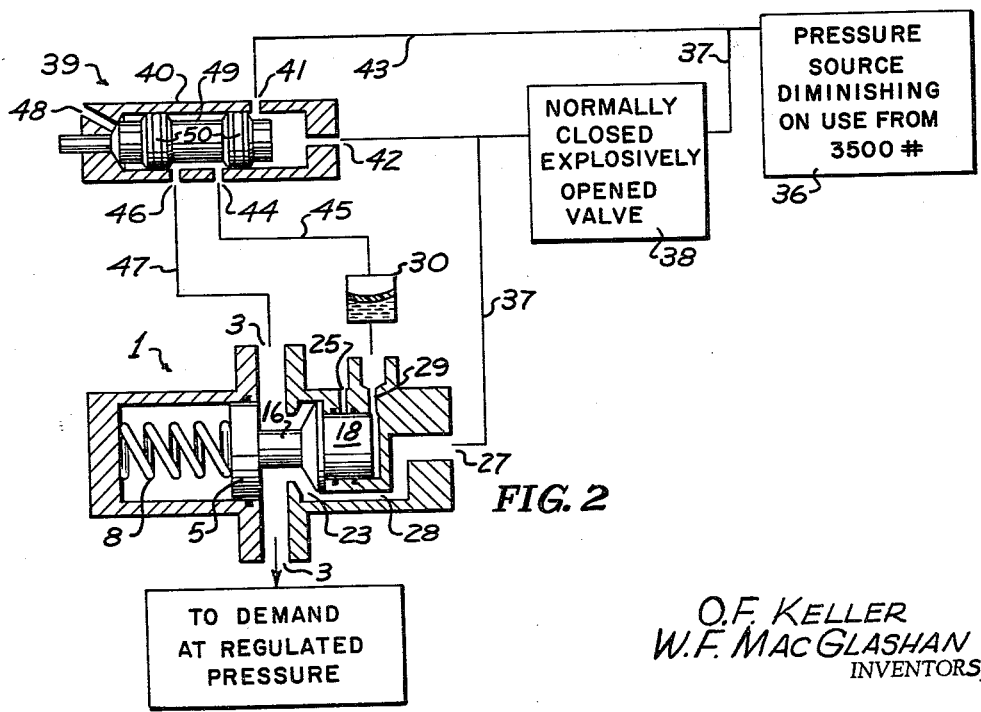
FIGURE 2 is a similar diagrammatical view showing the pressure regulating system in its operative condition.

Upon movement of the valve armature 49 from the position shown in FIGURE 1 to the position shown in FIGURE 2, pressure is bled from the line 45 and isolation unit 30 to the downstream side of the regulator 1. As a consequence, pressure is relieved in the cavity 24 permitting the spring 8 to open the regulator valve and initiate its operation.

Regulated pressure is applied through the regulated pressure line 47, port 46, and port 44, and isolation unit line 45 to the diaphragm 34 so that the effective pressure behind the piston 18 is also the regulated pressure. As a consequence, the regulated pressure operates on the entire area of the piston 5 against the force of the regulating spring 8.

The pressure at the inlet chamber 23 has no effect on the operating of the regulator or regulator valve for the reason that the effective area of the piston 18 corresponds to the effective area of the valve seat ring 14 and valve armature seat 17. If the source of high pressure is not supplied with additional pressure fluid the intake pressure gradually decreases as the demand continues; however, the regulated pressure tends to remain constant until the inlet pressure has fallen to substantially equal value.

The restricted passage 33 damps movement of the armature 16 during operation of the regulator to prevent pressure surges in the system, and more particularly to prevent the development of resonate conditions within the regulator valve which cause chattering or squeeling.

While what hereinbefore has been described as the preferred embodiment of this invention, it is readily apparent that alterations and modifications may be resorted to without departing from the scope of this invention and such alterations and modifications are intended to be included within the scope of the appended claims.

We claim:
1. A pressure regulating system, comprising:
   a. a source of high pressure fluid;
   b. a valve body structure having an inlet for connection to said high pressure fluid source, an outlet for connection to a demand for regulated pressure fluid, and a valve seat between said inlet and said outlet, said valve body structure defining a cavity confronting said valve seat;
   c. a valve armature having a valve element movable to and from said valve seat for pressure regulation and also sealingly engageable therewith and a piston movable in said cavity and isolating said cavity from said inlet, the areas of said cavity and valve seat being substantially equal whereby said valve armature is substantially nonresponsive to variations in inlet pressure, and a regulator valve spring opposing said valve armature;
   d. a control valve for initially connecting said cavity with said source of high pressure fluid, thereby to cause said piston to force said valve element into sealing engagement with said valve seat, and for subsequently connecting said cavity with the outlet side of said valve body structure to permit regulatory movement of said valve armature;
   e. an isolation unit operably connected to and disposed between said cavity and said control valve, said unit consisting of a cup member, a passageway interconnecting said cavity and said cup member, a diaphragm mounted in said cup member and normal to said passageway;
   f. a liquid substantially filling said cavity adjacent said piston, said passageway and said cup member between said diaphragm and passageway whereby actuation of said control valve deflects said diaphragm and moves said piston in said cavity.

2. A pressure regulating system, comprising:
   a. a source of high pressure fluid;
   b. a valve body structure having an inlet for connection to said high pressure fluid source, an outlet for connection to a demand for regulated pressure fluid, and a valve seat between said inlet and said outlet, said valve body structure defining a cavity confronting said valve seat;
   c. a valve armature having a valve element movable to and from said valve seat for pressure regulation and also sealingly engageable therewith a piston movable in said cavity and valve seat being substantially equal whereby said valve armature is substantially non-responsive to variations in inlet pressure, and a regulator valve spring opposing said valve armature;
   d. a control valve for initially connecting said cavity with said source of high pressure fluid, thereby to cause said piston to force said valve element into sealing engagement with said valve seat, and for subsequently connecting said cavity with the outlet side of said valve body structure to permit regulatory movement of said valve armature;
   e. an isolation unit operably connected to and disposed between said cavity and said control valve, said unit consisting of a cup member, a passageway interconnecting said cavity and said cup member, a diaphragm mounted in said cup member normal to said passageway;
   f. a liquid substantially filling said cavity, passageway and cup member below said diaphragm whereby actuation of said control valve deflects said diaphragm and moves said piston in said cavity;
   g. and an initially closed valve interposed between said source of high pressure and the inlet of said valve body structure, and also said control valve, said initially closed valve adapted, when opened, to cause said control valve to move from its initial to its subsequent position, and to supply high pressure fluid to said inlet for pressure regulation.

References Cited in the file of this patent
UNITED STATES PATENTS

| | | |
|---|---|---|
| 251,726 | Mueller et al. | Jan. 3, 1882 |
| 1,294,151 | Page | Feb. 11, 1919 |
| 1,764,790 | Hook et al. | June 17, 1930 |
| 2,226,761 | Fox | Dec. 31, 1940 |
| 2,934,090 | Kenann et al. | Apr. 26, 1960 |
| 3,058,482 | Nesselbush et al. | Oct. 16, 1962 |

FOREIGN PATENTS

| | | |
|---|---|---|
| 846,106 | Great Britain | Aug. 24, 1960 |